United States Patent [19]
Leonardi

[11] Patent Number: 5,903,959
[45] Date of Patent: May 18, 1999

[54] FASTENER FOR RETAINING SHOE LACES AND DRAWSTRINGS

[76] Inventor: David P. Leonardi, 2320 Plaza Del Grande, Las Vegas, Nev. 89102

[21] Appl. No.: 08/977,434

[22] Filed: Nov. 24, 1997

[51] Int. Cl.⁶ .............................. A43C 7/00; F16G 11/00
[52] U.S. Cl. .................... 24/712.1; 24/115 G; 24/712.3; 24/712.5
[58] Field of Search ............................... 24/712.1, 712.2, 24/712.3, 712.5, 712.9, 713.3, 713.4, 713.8, 714, 115 G, 136 L

[56] References Cited

U.S. PATENT DOCUMENTS

| | | | |
|---|---|---|---|
| 0,947,111 | 11/1910 | Lorentz | 24/115 G |
| 2,911,697 | 11/1959 | Henderson | 24/712.5 |
| 4,112,551 | 9/1978 | Sales | 24/712.5 |
| 4,477,947 | 10/1984 | Lyons | 24/115 G |
| 4,680,835 | 7/1987 | Horng | 24/712.5 |
| 4,715,094 | 12/1987 | Herdman | 24/712.3 |
| 4,839,946 | 6/1989 | Murai . | |
| 5,156,574 | 10/1992 | Gai . | |
| 5,345,657 | 9/1994 | Shimizu | 24/115 G |

FOREIGN PATENT DOCUMENTS

| | | | |
|---|---|---|---|
| 0572449 | 1/1958 | Italy | 24/712.1 |
| 0038186 | 3/1913 | Switzerland | 24/712.1 |

*Primary Examiner*—Victor N. Sakran
*Attorney, Agent, or Firm*—Quirk & Tratos

[57] ABSTRACT

A shoe lace fastener is set forth which includes a base member and a clamp member. The base member has an opening defining a pair of bearing surfaces and the clamp member has legs adapted to be received in the opening to trap and secure lace ends threaded through holes in the legs.

16 Claims, 3 Drawing Sheets

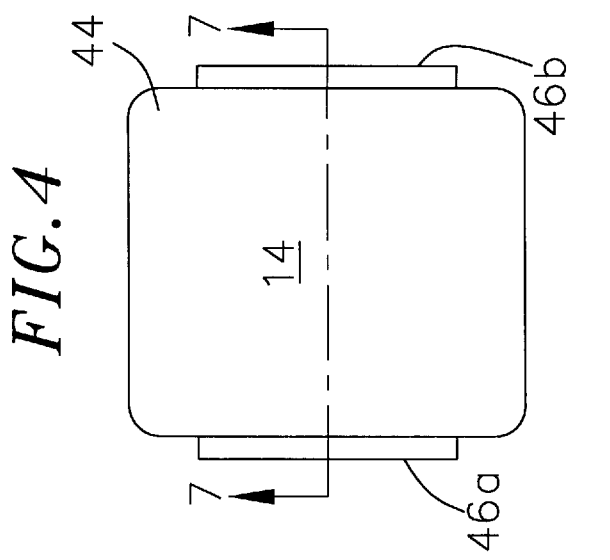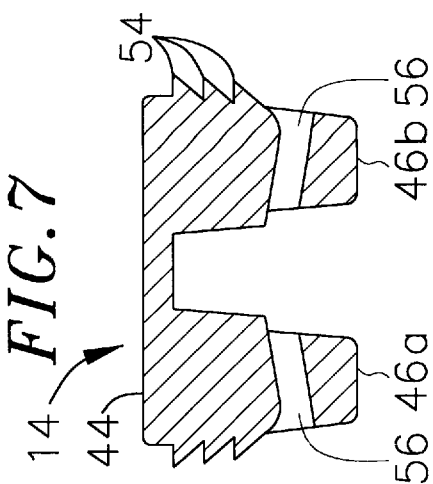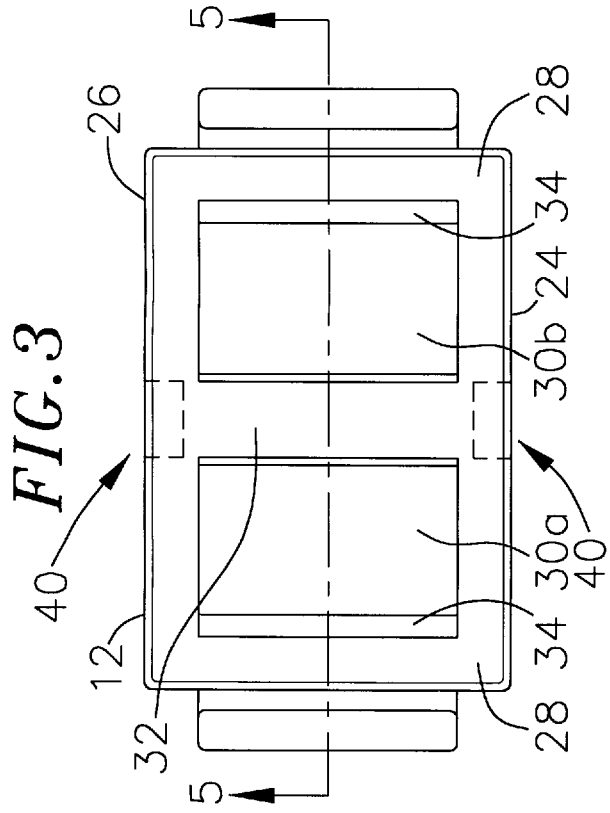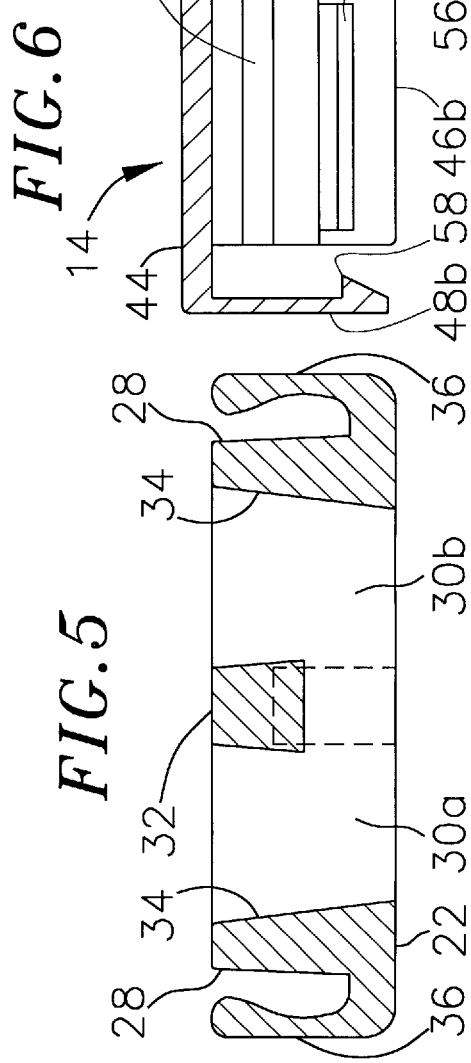

FASTENER FOR RETAINING SHOE LACES AND DRAWSTRINGS

FIELD OF THE INVENTION

The present invention relates to fasteners for holding shoe laces, drawstrings and the like tightly in place without knotting or tying the laces.

BACKGROUND OF THE INVENTION

Ever since shoes have been developed with eyelets and shoe laces for retaining the shoes in place on human feet, mankind has been confronted with the difficulty of tying the laces, keeping the laces tied, untying the laces, adjusting the laces, to say nothing of teaching children how to tie shoe laces. Tying shoe laces is also difficult for persons suffering from arthritis or other maladies or injuries to the hands and fingers.

Over the years a variety of shoe lace fastening and holding devices have been developed including Boden U.S. Pat. No. 5,156,574 and Murai U.S. Pat. No. 4,839,946. In these devices there is a requirement for activation of either a spring mechanism or the like to retain the fastener and laces in the tightened condition. In none of these references does pulling on the laces act to cause the fastener to grip the laces tighter to prevent loosening thereof.

It would be advantageous to provide a fastener adapted to be connected to shoe laces and drawstrings which, when the laces or drawstrings are pulled, tightens the fastener to the laces against release of relaxing of the laces and further which can easily be released to loosen the laces.

SUMMARY OF THE INVENTION

Toward this end, the shoe lace and drawstring fastener of the present invention overcomes the problems noted above with prior fasteners and provides for the tightening of the fastening grip as the laces are pulled.

The shoe lace and drawstring fastener includes a base member having at least one and preferably a pair of openings defining walls or barriers. A clamp member has a pair of depending legs each adapted to be received into the opening, each leg further including a hole adapted to pass a lace therethrough. Accordingly, each end of the lace from, for example, a shoe, is threaded through the openings and inside out through the holes in the legs. Means are provided on the legs for trapping and holding the lace so threaded against the barrier. Preferably the hole is so constructed that pulling on the loose lace ends cinches and tightens the shoe laces of the shoe. The tension of the tightened laces maintains the fastener and the laces tight. Pulling of the laces in a direction to unthread from the fastener increases the trapping force holding the lace against the barrier.

The trapping means may include teeth or serrations and the legs and barriers may be cooperatively slanted or inclined to provide a surface over which the trapping effect can be imposed.

In a further aspect, means are provided to capture the clamp member loosely to the base member and may be embodied as a pair of arms adapted to be disposed in cooperative channels to permit a degree of relative movement between the base member and clamp member to permit the clamp member to be spaced from the base member for the tightening and loosening of the laces. Still further, the base member may be provided with one or more retainers to hold the lace ends.

BRIEF DESCRIPTION OF THE DRAWINGS

These and other features and advantages will become appreciated as the same becomes better understood with reference to the specification, claims and drawings wherein:

FIG. 3 is a top view of the base member of the fastener;

FIG. 4 is a top view of the clamp member of the present invention;

FIG. 5 is a side section view of the base member;

FIG. 6 is a section view taken along line 7—7 of FIG. 4;

FIG. 7 is a section view of the clamp member taken along line 7—7 of FIG. 4.

DESCRIPTION

Figure 1:
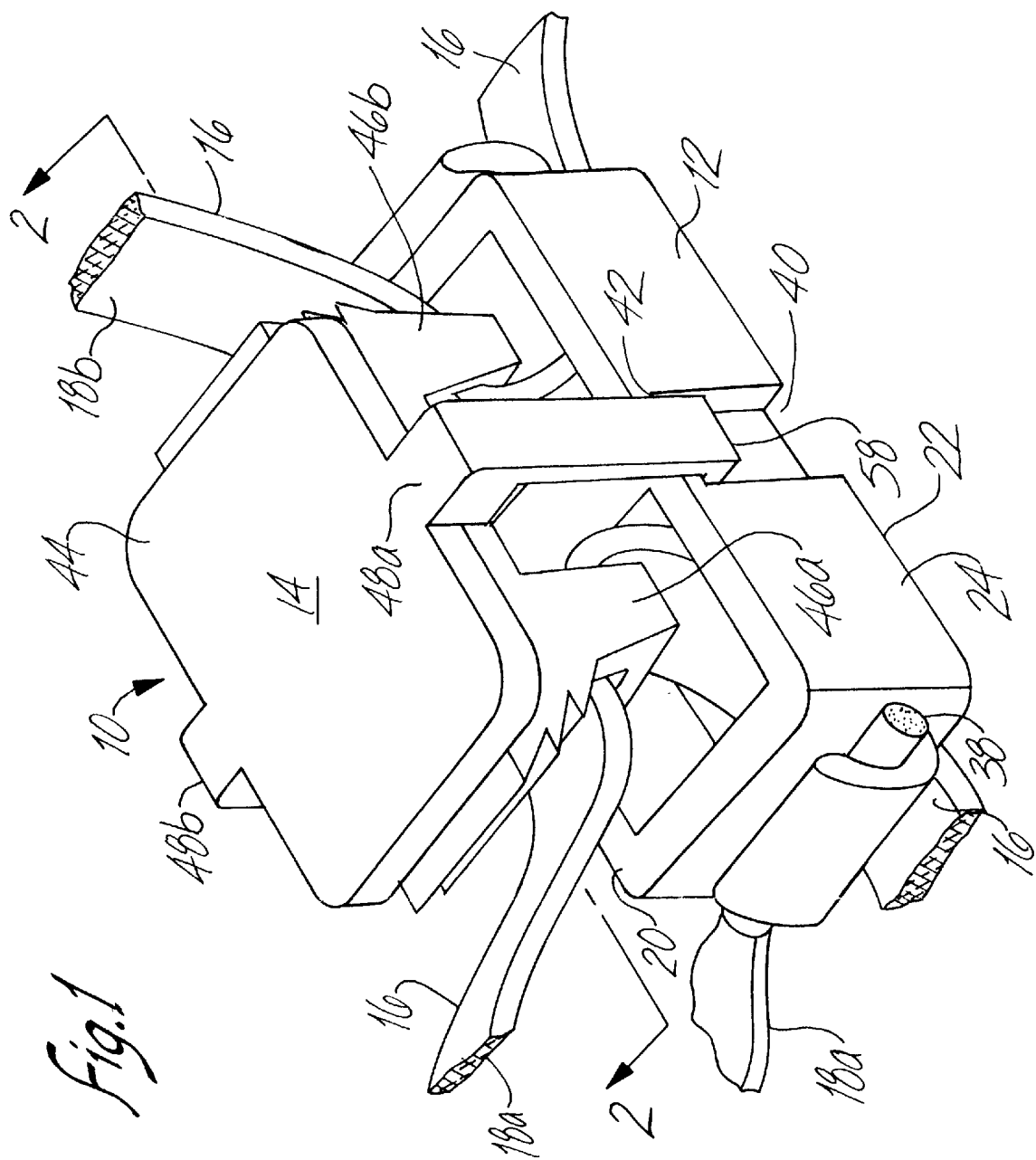
FIG. 1 is a top front perspective view of the fastener of the present invention showing the threading of a shoe lace.

Turning to the drawings, FIG. 1 shows a first embodiment of a fastener 10 according to the present invention. The fastener 10 includes a base member 12 and a clamp member 14 which, as described below, cooperate to secure a shoe lace 16 and more particularly lace ends 18a,b. In a known fashion, the shoe lace 16 is threaded through eyelets on a shoe and is thereafter cooperatively passed through the base and clamp members 12, 14 for fastening thereof. By virtue of the fastener 10, the lace ends 18a,b are secured dispensing with the need for fashioning a knot in the lace 16 as heretofore has been the technique for securing the shoe to the foot.

Figure 2:
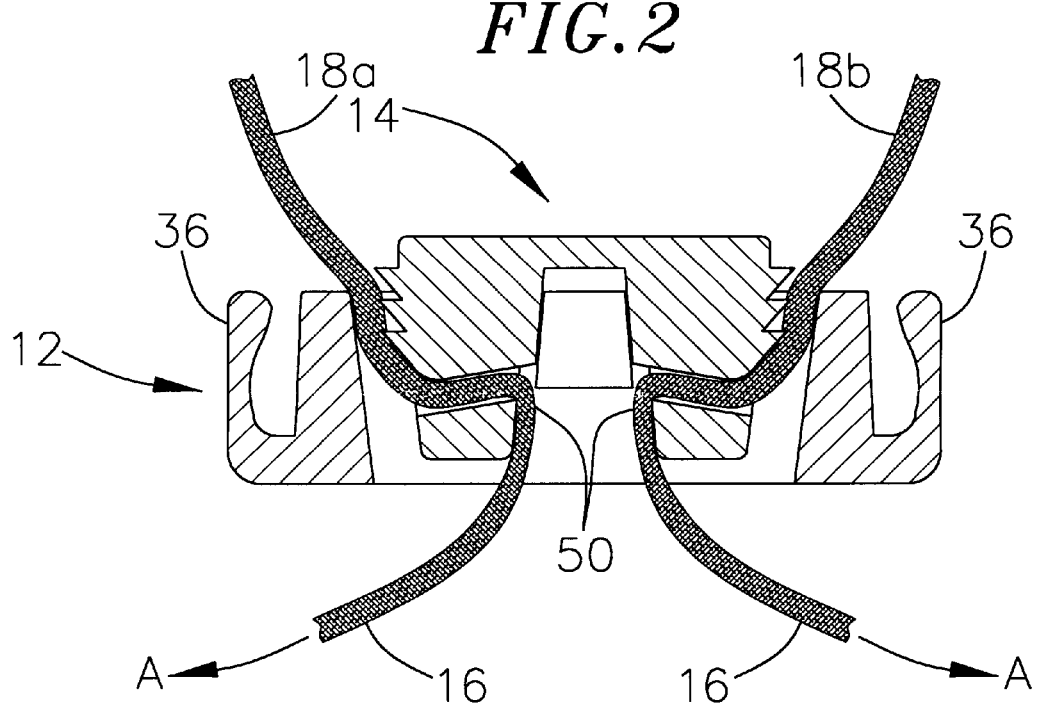
FIG. 2 is a section of the fastener taken along line 2—2 of FIG. 1.

With reference to FIGS. 1 through 3, 5, the base member has, in plan view, a generally rectangular configuration having an upper end 20, lower end 22, front and rear walls 24, 26 and end walls 28. Extending between the upper and lower ends 20, 22 are a pair of openings 30a,b separated by a bridge 32 extending between the front and rear walls 24, 26. As shown in FIGS. 1 and 2, the lace ends 18a,b are threaded through the corresponding openings 30a,b and are separated by the bridge 32.

The end walls 28 at the inside surfaces thereof are slanted inwardly from the upper end 20 to define bearing surfaces 34. As will become appreciated, the lace ends 18a,b are forcibly retained against the bearing surfaces 34 by the fastener 10.

The base member 12 includes at the exterior of each end walls 28 a retainer 36 which, as suggested in FIG. 1, is adapted to frictionally retain the aglet 38 of the lace ends 18a,b or of the lace itself proximate the aglets 38 to secure the loose ends of the shoe lace fastened by the fastener 10. As shown in FIG. 2, the end of each retainer 36 is adapted to plastically deform from the end wall 28 to receive and frictionally retain the aglet 38.

With continuing reference to FIGS. 1 and 3, the base member includes at the exterior of the front and rear walls 24, 26 a pair of channels 40 which extend from the lower end 22 to terminate short of the upper end 20. The end of each channel 40 defines a stop 42 the purpose of which will hereinafter become evident.

With reference to FIGS. 1, 2, 4, 6 and 7, it is seen that the clamp member 14 includes a rectangular and substantially planar cap 44 having depending therefrom a pair of legs 46a,b and arms 48a,b. The legs 46a,b are adapted to be received in the openings 30a,b as shown in FIG. 2 to create an interference fit between the bridge 32 and bearing surfaces 34. Accordingly, the inside surfaces 50 of each of the legs 46a,b are substantially parallel to receive the bridge 32 therebetween for guiding of the raising and lowering motion of the clamp member 14 relative to the base member 12. The outside surfaces 52 of each of the legs 46a,b are cooperatively angled to substantially correspond to the angling of the bearing surfaces 34 of the base member 12 to provide the aforementioned lace-clamping action between the clamp member 14 and base member 12. To enhance the clamping and securing action between the clamp member 14 and base member 12, each of the outside surfaces 52 of the legs 46a,b may include teeth 54 extending transverse to the direction of the lace passing through the fastener 10, serrations or other high friction surface adapted to grasp the lace ends 18a,b. Alternatively the bearing surfaces 34 may be provided with teeth or serrations or both the outside surfaces 52 and bearing surfaces 34 may have teeth or serrations.

As best seen in FIGS. 1, 2 and 7, the clamp member 14 also includes through each leg 46a,b a throughhole 56 through which each of the lace ends 18a,b is threaded. As shown in FIG. 2, the lace ends 18a,b from the shoe are threaded through the openings 30a,b, inside out, through the holes 56 and thereafter from the upper end 20 of the base member 12. Preferably as shown in FIG. 7, each hole 56 declines from the inside surface 50 to the outside surface 52. Accordingly, tension on the lace ends 18a,b in the direction of arrow A (FIG. 2) urges the clamp member 14 toward the base member 12 and the legs 46a,b to forcefully clamp the lace ends 18a,b against the bearing surfaces 34 to prevent or resist relaxing of the tension.

The arms 48a,b are adapted to extend from the cap 44 to the outside of the base member 12 to slide there along. A tang 58 at the end of each arm 48a,b is received into a cooperative channel 40 as shown in FIG. 1. Accordingly, when the clamp member 14 is in a raised position as shown in FIG. 1, the engagement of the tangs 58 with the stops 42 defined by the channels 40 captures the clamp member to the base member 12 so that the two are not separated. Furthermore, the engagement of the tangs 58 in the channels 40 guide the relative movement between the clamp member 14 and base member 12.

To secure the lace ends, the clamp member 14 is raised relative to the base member 12 to a position shown in FIG. 1. Unless the laces are already under tension, the cap member 14 raises automatically as the lace ends 18a,b are pulled through the clamp member 14 to tighten the laces. The lace ends 18a,b are pulled to tighten the laces for the shoe to the desired tension. As the lace ends 18a,b are pulled the fastener is drawn down onto the top of the shoe and the laces are pulled to the desired tightening tension. When so tightened, release of the lace ends 18a,b, by virtue of the tension of the laces in the direction of arrows A (FIG. 2) and the configuration of the clamp member 14, pulls the clamp member 14 into the base member 12 trapping the lace ends therebetween and securing the laces against release of that tension. The tension of the lace ends 18a,b and the cooperation of the laces as they pass through the inclined holes 56 urges the clamp member 14 into the base member 12 and by virtue thereof imposes a clamping force between the leg outside surfaces 52 and bearing surfaces 34 to trap the lace ends 18a,b therebetween. In this position, the shoe lace 16 is fastened and cannot come undone.

To release the laces, the clamp member 14 is pulled from the base member 12 freeing the lace ends 18a,b trapped therebetween. The fastener 10 can then be slid along the lace ends 18a,b or the laces can be pulled through the fastener 10 to provide slack for loosening of the laces of the shoe.

Figure 8:
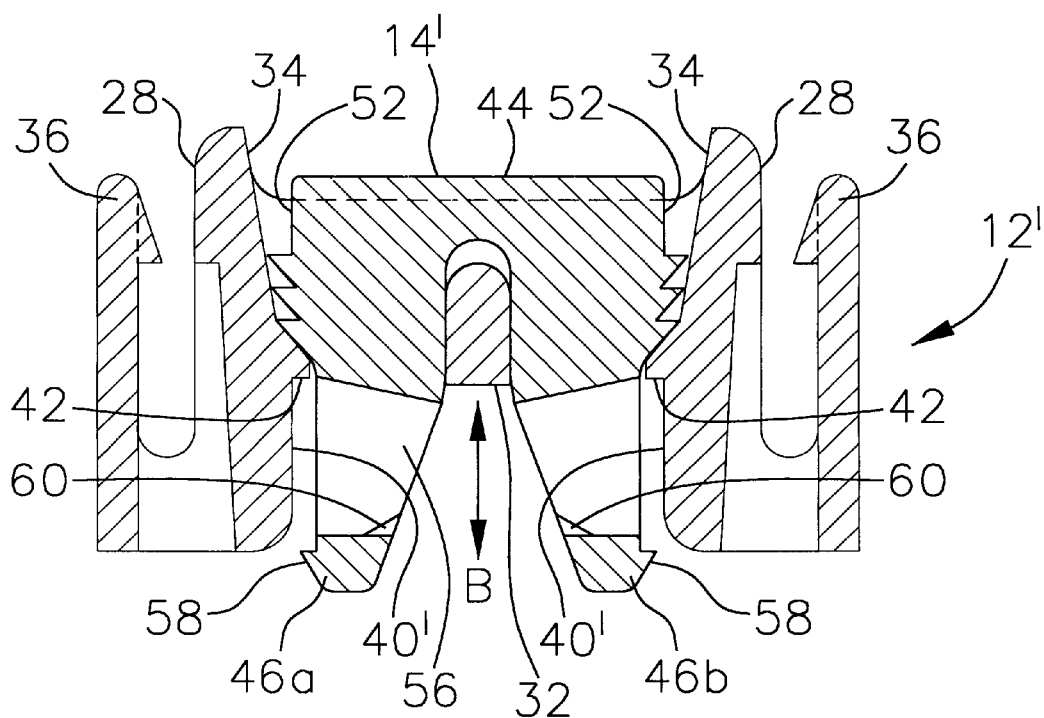
FIG. 8 is a section view of a further embodiment of the fastener of the present invention.

With reference to FIG. 8, a further embodiment of the invention is shown. Like members carry like reference numerals.

The base member 12' includes at the end walls 28 the retainers 36 of the type described above for retaining the aglets 38 of the lace ends 18a,b. Bridge 32 extends between the front and rear walls, 24, 26 (not shown in FIG. 8) in the manner described above. At the insides of the end walls 28, the bearing surfaces 34 are defined.

The clamp member 14' includes a cap 44 having the downward depending legs 46a,b which are adapted to straddle the bridge 32. Below the bearing surfaces 34, but within the openings 30a,b, are defined the channels 40' which receive tangs 58 defined at the ends of the legs 46a,b. The channels 40' at their ends define stops 42. In the manner described above, the tangs 58 slide within the channels 40' and engage the stops 42 to prevent the clamp member 14, from being removed from the base member 12'. The bridge 32 not only guides the motion of the clamp member 14' as suggested by arrow B in FIG. 8 but also retains, in cooperation with the tangs 58 and channel stops 42, the clamp member 14' to the base member 12'.

In the manner similar to that described above, the lace ends 18a,b are threaded through holes 56 formed in the legs 46a,b, the lace ends thereafter passing between the leg outside surfaces 52 and bearing surfaces 34. To tighten the laces, the clamp member 14' is disposed at a raised position and the lace ends 18a,b are pulled which draws the fastener 10' down onto the shoe and imposes a tension in the laces. Release of the lace ends 18a,b, by virtue of the tension, urges the clamp member 14' into the base member 12' to capture the lace ends 18a,b between the outside surfaces 52 and bearing surfaces 34 of the fastener 10'. Relaxation of the tension of the laces, by the cooperation of the configuration of the holes 56 as they are declined through the legs 46a,b, increases the tightening effect.

To further resist relaxation of the clamping effect, the inside bounds of each hole 56 may include a sharp ridge 60 to resist withdrawing of the lace ends 18a,b from the holes 56.

To loosen the laces, the clamping member 14' is withdrawn from the base member 14' to release the captured lace ends 18a,b whereupon the fastener 10' may be slid along the lace ends 18a,b or the lace ends 18a,b threaded back through the fastener 10' to provide slack for loosening of the laces of the shoe.

While I have shown and described certain embodiments of the present invention, it is to be understood that it is subject to many modifications and changes without departing from the spirit and scope of the claims presented herein.

I claim:

1. A shoe lace fastener comprising:
    a base member having an opening defining a pair of inclined bearing surfaces;
    a clamp member disposed on the base member for relative movement between a release and a capture position, said clamp member having a pair of legs each to be received into an opening, each leg further including an inclined hole adapted to pass a lace inside out therethrough, said lace therefrom extending upwardly from the base member whereupon pulling on the lace through the holes urges the clamp member to the capture position and each lea having an inclined outside surface to mate with the inclined bearing surface to trap and hold the lace between the bearing surface and the leg outside surface when the clamp member is in the capture position.

2. The fastener of claim 1 wherein each hole is angled downwardly from the inside to the outside surface.

3. The fastener of claim 2 wherein the leg outside surfaces include teeth.

4. The fastener of claim 1 further including means to retain the clamp member to the base member.

5. The fastener of claim 4 including a pair of arms disposed on one of the base and clamp member to retain said members together.

6. The fastener of claim 1 wherein the base member includes at least one retainer to retain the free ends of the lace.

7. The fastener of claim 6 wherein the base member includes a pair of retainers each to retain one end of the lace.

8. A shoe lace fastener comprising:

a base member having a pair of openings defining a pair of inclined bearing surfaces;

a clamp member retained by the base member for movement between a lace release and a lace capture positions, the clamp member having a pair of legs each having an inside and an inclined outside surface to engage a bearing surface, each leg received into an opening, each leg further including a hole for passing a lace therethrough from the inside to the outside surface to thereby urge said clamp member linearly downward relative to the base member when said lace is pulled and means on the outside surface of the legs for trapping and holding the lace between the base member inclined surface and said outside surfaces when the clamp member is in the capture position.

9. The fastener of claim 8 wherein the openings are separated by a bridge.

10. The fastener of claim 8 wherein the trapping means includes teeth to engage the lace.

11. The fastener of claim 10 wherein the teeth extend across the outside surface of the legs.

12. The fastener of claim 8 wherein the holes are angled downwardly from the inside to the outside surface to urge the clamp member to the capture position in response to pulling on the laces.

13. The fastener of claim 8 including a pair of arms disposed on one of the base and clamp member and adapted to retain said members together.

14. The fastener of claim 8 wherein the base member includes at least one retainer adapted to retain the free ends of the lace.

15. The fastener of claim 14 wherein the base member includes a pair of retainers each adapted to retain one end of the lace.

16. A fastener for a shoe lace comprising:

a base member having a pair of vertically disposed openings separated by a vertical bridge, each opening defining an upwardly inclined bearing surface on the base member;

a clamp member retained by the base member for vertical movement between a lace release and a lace capture position, the clamp member having a pair of legs disposed to straddle said bridge and to be received into said openings, each leg having an inside and an inclined outside surface to mate with a bearing surface, each leg further including a hole declining from the horizontal from the inside to the outside for passing a lace therethrough from the inside to the outside surface for engagement between the bearing surface and the outside surface when the clamp member is in the capture position, said holes urging said clamp member linearly downward relative to the base member to said capture position when said lace is pulled.

* * * * *